United States Patent
Gehlot

(12) 
(10) Patent No.: US 6,914,716 B2
(45) Date of Patent: Jul. 5, 2005

(54) MODULATED PUMP SOURCE FOR FIBER RAMAN AMPLIFIER

(75) Inventor: Narayan L. Gehlot, Sayreville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 414 days.

(21) Appl. No.: 09/990,206

(22) Filed: Nov. 21, 2001

(65) Prior Publication Data

US 2003/0095745 A1 May 22, 2003

(51) Int. Cl.⁷ .............................................. H01S 3/00
(52) U.S. Cl. .................................. 359/334; 359/341.3
(58) Field of Search ............................. 359/334, 341.3

(56) References Cited

U.S. PATENT DOCUMENTS

| | | |
|---|---|---|
| 5,510,931 A | 4/1996 | Suyama |
| 6,122,298 A | 9/2000 | Kerfoot, III et al. |
| 6,147,794 A | 11/2000 | Stentz |
| 6,191,877 B1 | 2/2001 | Chraplyvy et al. |
| 6,282,002 B1 | 8/2001 | Grubb et al. |
| 6,384,963 B2 * | 5/2002 | Ackerman et al. ........... 359/334 |
| 6,657,775 B1 * | 12/2003 | Farmer et al. ............... 359/334 |
| 6,657,776 B2 * | 12/2003 | Gehlot ........................ 359/334 |

FOREIGN PATENT DOCUMENTS

EP 001315258 A1 * 5/2003

OTHER PUBLICATIONS

"Multichannel Crosstalk and Pump Noise Characterization of ER 3+—Doped Fibre Amplifier Pumped at 980 NM" Electronics Letters, IEEE Stevenage, GB, vol. 25, No. 7, Mar. 30, 1989, pp. 455–456, XP000047962.

* cited by examiner

*Primary Examiner*—Mark Hellner

(57) ABSTRACT

A pump source for a fiber Raman amplifier used in a WDM optical communication system is formed to generate an RF-modulated pump signal (as opposed to the prior art CW signals). The modulation frequency and index of the RF-modulated pump signal are controlled to impart a sufficient degree of "randomness" to the presence of the pump signal at each wavelength, thus minimizing cross talk between the signals and improving the transfer of power from the pump signal to the plurality of optical input signals.

14 Claims, 1 Drawing Sheet

MODULATED PUMP SOURCE FOR FIBER RAMAN AMPLIFIER

TECHNICAL FIELD

The present invention relates to a Raman amplified optical communication system and, more particularly, to the utilization of a radio frequency (RF)-modulated pump source to reduce crosstalk in a WDM optical communication system and increase the Raman pump power coupled into the fiber channel.

DESCRIPTION OF THE PRIOR ART

Optical amplification by stimulated Raman scattering in a single-mode fiber is of interest for applications in optical communication systems. In particular, the use of Raman amplification in wavelength division multiplexed (WDM) optical communication systems is particularly attractive, since the bandwidth of the Raman amplifier can be large enough to accommodate two or more WDM channels. The performance of an intensity-modulated WDM system using Raman amplifiers, however, may be limited by the cross talk between the information channels and the amount of power actually coupled from the Raman pump into the information channels (as well as fiber nonlinearity-related penalties).

The cross talk in Raman amplifiers is mediated by the pump source. That is, each modulated channel causes pattern-dependent pump depletion that is subsequently superimposed on all other channels during the amplification process. The crosstalk has been found to be dependent on the modulation frequency of the channels, as well as the relative speed between the channels and the pump. For this reason, the amount of cross talk in the co- and counter-propagating pump configurations have been found to differ significantly.

Regarding the issue of pattern dependence, if one channel is transmitting a long stream of "1's" or "0's", the power in the adjacent channel will change. Therefore, optical amplifiers would prefer a random data pattern. Obviously, since these channels are being used to send information signals in the form of digital data, they should not be subjected to a randomization process. Moreover, even if the information-bearing individual channels were randomized (i.e., equal distribution of "1" s and "0" s in the information data) with the use of scramblers (usually expensive, large in size, and requiring de-scramblers at the receiver), there can be problems related to synchronization for bit/byte/word interleaved systems when one or more of the transmission-side tributaries fail.

Thus, a need remains in the art for reducing the presence of cross talk and increasing the coupled power in Raman amplified WDM optical communication systems.

SUMMARY OF THE INVENTION

The need remaining in the prior art is addressed in accordance with the present invention, which relates to a Raman amplified optical communication system and, more particularly, to the utilization of an RF-modulated pump source to reduce cross talk in a WDM optical communication system and increase the Raman pump power coupled into the fiber channel without increase fiber channel nonlinearity-related penalties.

In accordance with the present invention, a pump source is configured to include a signal modulator, responsive to both a conventional continuous wave (CW) pump source and an RF signal. The RF signal is used to modulate the pump signal, forming a modulated pump signal that is thereafter applied as an input to a fiber Raman amplifier (in either a co-propagating or counter-propagating configuration). The frequency of the applied RF signal is chosen to be a multiple (or sub-multiple) of the data rate of the information channels, controlling the average applied power and the uniformity of the optical power within a data bit. The modulation depth of the RF signal and its duty cycle (i.e., the ratio of $[T_{on}/(T_{on} + T_{off})]$) controls the average Raman amplifier optical power coupled to the fiber channel to limit fiber nonlinearity-related penalties and, therefore, allowing an increase in Raman pump laser power coupled to the fiber channel.

The RF-modulated pump source of the present invention may be used with either a co-propagating pump arrangement or a counter-propagating pump arrangement. Indeed, a hybrid WDM optical communication system utilizing both co- and counter-propagating pumps may use a multiple number of such RF-modulated pump sources.

BRIEF DESCRIPTION OF THE DRAWINGS

Referring now to the drawings.

DETAILED DESCRIPTION

Figure 1:
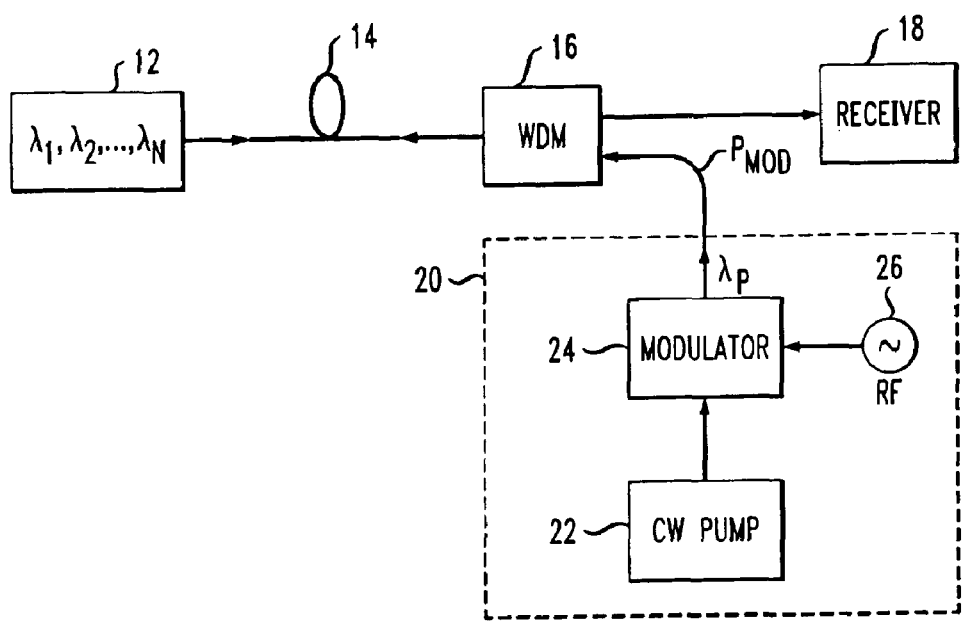
FIG. 1 illustrates an exemplary WDM Raman amplified optical communication system utilizing an RF-modulated pump source in accordance with the present invention.

FIG. 1 illustrates an exemplary WDM optical communication system 10, which utilizes fiber Raman amplification. As shown, a transmitter 12 is included and used to provide a plurality of N optical input signals, each occupying a different channel. These signals are presented by the notation $\lambda_1, \lambda_2, \ldots, \lambda_2$ in FIG. 1. It is to be understood that transmitter 12 may comprise, in fact, a plurality of separate transmitting sources (i.e., lasers), and include a wavelength division multiplexer (WDM)—not shown—or other suitable devices, to combine all of the optical input signals onto a single optical transmission fiber 14. In an exemplary system that utilizes fiber Raman amplification, the plurality of input optical signals may utilize wavelengths in the range of 1520 nm–1620 nm.

Amplification of the various signals is provided along the length of transmission fiber 14 by supplying a pump signal, denoted by $\lambda_p$ in FIG. 1. In this particular embodiment, a wavelength division multiplexer 16 is used to couple the pump signal onto transmission fiber 14 in a counter-propagating relationship with respect to the plurality of N input optical signals. An optical pump signal having a wavelength of approximately 1440 nm has been found to provide amplification to optical signals within the range (1520 nm–1620 nm) discussed above. The amplified output signals, operating at wavelengths $\lambda_1, \lambda_2, \ldots, \lambda_N$ are thereafter transmitted to one or more units within an optical receiver 18.

In accordance with the present invention, the pump signal comprises an RF-modulated signal, denoted $P_{mod}$, provided by a pump source 20. As shown in FIG. 1, pump source 20 includes a CW pump element 22, as commonly used in prior art arrangements to generate a continuous wave pump signal at the predetermined pump wavelength (e.g., 1440 nm). In this case, however, the output from CW pump element 22 is applied as an input to a modulator 24. Modulator 24 may comprise an external modulator integrated directly with a laser used as pump element 22, or may comprise a separate device, such as an electroabsorption modulator (EAM). Both arrangements are well known in the art and either may be used to provide a modulated pump signal in accordance with the present. As shown, pump source 20 further comprises an RF modulator 24, used to provide an electrical RF input to modulator 24, where this sinusoidal input signal is used to modulate the CW pump output from pump element 22 and form the RF-modulated pump signal $P_{mod}$. The modulation depth of the RF signal and its duty cycle (i.e., the ratio $[T_{on}/(T_{on}+T_{off})]$) controls the average Raman amplifier optical power coupled to the fiber channel to limit fiber nonlinearity-related penalties and, therefore, allows an increase in the Raman pump laser power coupled to the fiber channel.

Figure 2:
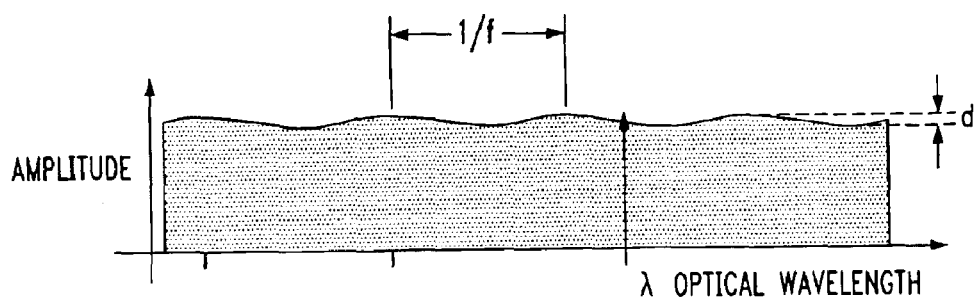
FIG. 2 is a graph of an exemplary pump signal that may be used to minimize cross talk and thus increase applied pump power in accordance with the teachings of the present invention.

FIG. 2 contains a graph illustrating an exemplary RF-modulated pump signal that may be used in the arrangement as shown in FIG. 1. The frequency of the modulation signal (f) is chosen to be a multiple (or sub-multiple) of the data rate per wavelength since any other frequency could result in introducing beat frequencies into the data signals. The modulation depth d controls the average optical power, allowing an increase in Raman pump laser power. In particular, the modulation depth of the RF signal as applied to the CW Raman pump is selected to be less than the extinction ratio of the digital data bits appearing along the information-bearing channels (i.e., the ratio of optical power associated with a logic "1"/optial power associated with a logic "0"). This value is useful for signal recovery, while also being sufficient to generate the required "randomness" to minimize cross talk and increase the transfer of power from the pump signal to the information-bearing signals. There is a trade-off between modulation depth and cross talk, since the larger the modulation depth the less cross talk will exist, but the greater the presence of non-linearities in the amplified output signal. The amount of RF modulation depth and duty cycle control on the Raman pump source allows for more pump power coupling without introducing fiber nonlinearity-related penalties. Larger depths of pump modulation can eventually interfere with the digital data on individual channels, if not synchronized properly (and will also depend on whether co-propagating or counter-propagating pump geometries are used).

In summary, therefore, the utilization of an RF-modulated pump input signal for a fiber Raman amplifier has been found to reduce cross talk between the information signals and increase the power transferred from the pump to the plurality of data signals. The RF-modulated pump can be used for either a co- or counter-propagating configuration, with improved results for either case. It is to be understood that the above-described embodiment is merely illustrative of the principles of the present invention. Numerous and various other arrangements can be made in accordance with these principles and are considered to fall within the spirit and scope of the invention as defined by the claims appended hereto.

What is claimed is:

1. An optical transmission system for amplifying a plurality of N input optical signals operating over a wavelength range of $\lambda_1$–$\lambda_N$, the system comprising:

a radio frequency (RF)-modulated pump source for providing an RF-modulated optical pump signal at a predetermined wavelength $\lambda_p$, the modulation frequency and depth being configured so as to increase pump power transferred from the pump to the plurality of N input optical signals whereby the cross talk between said plurality of N input optical signals is reduced; and a transmission optical fiber coupled to receive said plurality of N input optical signals and to the RF-modulated pump source for utilizing the RF-modulated optical pump signal to generate optical amplification in said plurality of N input optical signals along the transmission fiber.

2. The transmission system as defined in claim 1 wherein the system further comprises:

a wavelength division multiplexer for coupling the RF-modulated pump signal into the transmission fiber.

3. The optical transmission system as defined in claim 1 wherein the RF-modulated pump source comprises:

an optical source for generating a continuous wave (CW) optical signal at the predetermined pump wavelength;

a signal generator for producing an electrical RF sinusoidal signal having the predetermined frequency and modulation depth; and a modulator responsive to both the optical source and the signal generator for producing the RF-modulated optical pump signal.

4. The optical transmission system as defined in claim 3 wherein the modulator comprises an external modulator section integral with the optical source.

5. The optical transmission system as defined in claim 3 wherein the modulator comprises a discrete modulator component.

6. The optical transmission system as defined in claim 5 wherein the discrete modulator component comprises an electroabsorption modulator.

7. The optical transmission system as defined in claim 2 wherein the system utilizes a counter-propagating RF-modulator optical pump signal, with the wavelength division multiplexer disposed at the output end of the transmission fiber and the RF-modulated pump source coupled to said transmission fiber so as to propagate the RF-modulated optical pump signal in a direction opposite to that of the plurality of N input optical signals.

8. The optical transmission system as defined in claim 2 wherein the system utilizes a co-propagating RF-modulated optical pump signal, with the wavelength division multiplexer disposed at the input end of the transmission fiber and the RF-modulated pump source coupled to said transmission fiber so as to propagate the RF-modulated pump signal in the same direction as the plurality of N input optical signals.

9. The optical transmission system as defined in claim 1 wherein the plurality of N input optical signals operate over a wavelength range of approximately 1520 nm–1620 nm.

10. The optical transmission system as defined in claim 9 wherein the RF-modulated optical pump signal comprises a predetermined wavelength of approximately 1440 nm.

11. The optical transmission system as defined in claim 1 wherein the modulation frequency of the RF-modulated optical pump signal is a multiple of the rate of the plurality of N input data signals.

12. The optical transmission system as defined in claim 1 wherein the modulation frequency of the RF-modulated optical pump signal is a sub-multiple of the rate of the plurality of N input data signals.

13. The optical transmission system as defined in claim 1 wherein the modulation depth of the RF-modulated optical pump signal is maintained to be less than the extinction ratio of the input optical signals.

14. A method of increasing the pump power transferred between an optical pump source and optical information signals propagating through a transmission fiber, the method comprising the steps of:

provycling a continuous wave (CW) optical pump signal at a predetermined wavelength;

modulating said CW optical pump signal with a radio frequency (RF) signal to produce an RF envelope on said optical pump signal, wherein the modulation frequency and depth of the RF signal are configured to increase transferred pump power and reduce cross talk between the optical information signals; and coupling said RF-modulated optical pump signal into the transmission fiber with the optical information signals.

* * * * *